United States Patent
Hua et al.

(10) Patent No.: US 10,535,322 B2
(45) Date of Patent: Jan. 14, 2020

(54) ENABLING COMPRESSION OF A VIDEO OUTPUT

(71) Applicant: HEWLETT PACKARD ENTERPRISE DEVELOPMENT LP, Houston, TX (US)

(72) Inventors: Chanh V Hua, Houston, TX (US); Mujeeb Ur Rehman, Houston, TX (US); Yuchen Xu, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/747,118

(22) PCT Filed: Jul. 24, 2015

(86) PCT No.: PCT/US2015/042009
§ 371 (c)(1),
(2) Date: Jan. 23, 2018

(87) PCT Pub. No.: WO2017/018993
PCT Pub. Date: Feb. 2, 2017

(65) Prior Publication Data
US 2018/0218712 A1 Aug. 2, 2018

(51) Int. Cl.
*G06F 15/80* (2006.01)
*G09G 5/36* (2006.01)
(Continued)

(52) U.S. Cl.
CPC ........... *G09G 5/363* (2013.01); *G06F 3/1438* (2013.01); *G09G 5/006* (2013.01);
(Continued)

(58) Field of Classification Search
CPC ............... G09G 5/363; G09G 2360/06; G09G 2352/00; G06F 13/4068; G06F 1/185; G06F 2213/0026; G06F 3/1438; G06T 1/20
See application file for complete search history.

(56) References Cited

U.S. PATENT DOCUMENTS

| 7,843,458 B2 | 11/2010 | Ballew |
| 8,373,709 B2 | 2/2013 | Solki |

(Continued)

FOREIGN PATENT DOCUMENTS

| CN | 203503009 U | 3/2014 |
| KR | 10-2007-0094004 | 9/2007 |

(Continued)

OTHER PUBLICATIONS

PCT/ISA/KR, International Search Report and Written Opinion, dated May 30, 2016, PCT/US2015/042009, 12 pages.

(Continued)

*Primary Examiner* — Hau H Nguyen
(74) *Attorney, Agent, or Firm* — Hewlett Packard Enterprise Patent Department (57) ABSTRACT

Example implementations relate to a system for enabling compression of a video output. For example, the system can include a circuit board including a plurality of slots, each slot to receive a module, a multiplexor coupled between the plurality of slots, and a management controller, among other components. The management controller can detect a respective type of module coupled to each of the plurality of slots and instruct the multiplexor to transmit signals between a first slot among the plurality of slots and a second slot among the plurality of slots in response to detection of a graphics coprocessor module coupled to the first slot and an accelerator module coupled to the second slot. Similarly, the (Continued)

management controller can compress a video output from the first slot using the second slot.

20 Claims, 4 Drawing Sheets

(51) Int. Cl.
*G06F 3/14* (2006.01)
*G09G 5/00* (2006.01)

(52) U.S. Cl.
CPC ..... *G09G 2340/02* (2013.01); *G09G 2360/06* (2013.01); *G09G 2370/022* (2013.01); *G09G 2370/22* (2013.01)

(56) References Cited

U.S. PATENT DOCUMENTS 8,793,393 B2 7/2014 Ye et al.
2006/0174026 A1 8/2006 Robinson et al.
2007/0224844 A1 9/2007 Chuang et al.
2010/0077179 A1 3/2010 Stillwell, Jr. et al.
2013/0050393 A1 2/2013 Chen
2013/0246679 A1* 9/2013 Miyoshi ................. G06F 13/40 710/300
2015/0294434 A1* 10/2015 Nataros ................. G09G 5/363 345/520

FOREIGN PATENT DOCUMENTS

KR 10-2011-0067149 6/2011
KR 10-2015-0008828 1/2015

OTHER PUBLICATIONS

Qing Wang, "Design of IP Media Accelerator," IBM China Research Lab, ICME 2007, 4 pages.

* cited by examiner

ENABLING COMPRESSION OF A VIDEO OUTPUT

BACKGROUND

Server systems are designed for specific workloads with improved economic, density and performance. To improve performance of the server, additional hardware may be needed to accelerate workloads before transmission to client devices such as thin-clients smart phones, tablets or laptop computers. Including dedicated graphic processing modules at client devices may be cost prohibitive. Further, having data at a client device may increase risk of a security breach.

DETAILED DESCRIPTION

Server systems may be designed for specific workloads with improved economy, density and performance. In some server systems, high graphic performance is desired. While some cartridges have enhanced graphic capabilities within the processor, dedicated graphic coprocessors packaged on a mobile peripheral component interconnect express module (MXM) may provide improved graphics capabilities to allow the server system to address higher graphic content workloads such as three dimensional (3D) rendering to multiple displays. MXM is an interconnect standard based on the peripheral component interconnect express (PCIe) interface used in laptop computers and workstations to provide high performance graphics function to multiple displays. The MXM expansion slot may also be provided in laptops to provide an upgrade path from the standard graphic function provided in the base computer model to one with more powerful graphic capabilities. In order to obtain even greater graphic performance, additional hardware may be needed to compress video outputs from a MXM module before transmission to a remote display.

Having dedicated graphic processing modules at endpoints (e.g., client devices) may be cost prohibitive. It may be more cost effective to have graphic processing modules in the cloud and only assign such graphic processing modules to users in the cloud when they are needed. Such a system may utilize less graphic processor modules and hence lower cost. Moreover, when transmitting large amounts of video data in a network using only a graphic processing module, performance of client devices in the network may be poor. Hardware compression (e.g., via an accelerator) may provide improved performance as video display frame buffer is performed in the accelerator unit.

Enabling compression of a video output in accordance with the present disclosure allows MXM slots in a server cartridge to accept graphical coprocessor MXM modules. As used herein, a graphical coprocessor refers to a secondary processor which performs specialized graphics functions to reduce a workload for the main processor. For instance, a graphics coprocessor may perform two dimensional (2D) and/or 3D rendering, thereby reducing the workload on the main processor. In accordance with the present disclosure, an accelerator module, such as a compression MXM module, may be added to accept the video output from the graphic coprocessor MXM and compress the video in real-time before sending it through the network to a remote display (e.g., at a client device). As used herein, an accelerator module refers to a module that improves processor performance speeds as compared to a general purpose central processing unit (CPU).

Figure 1:
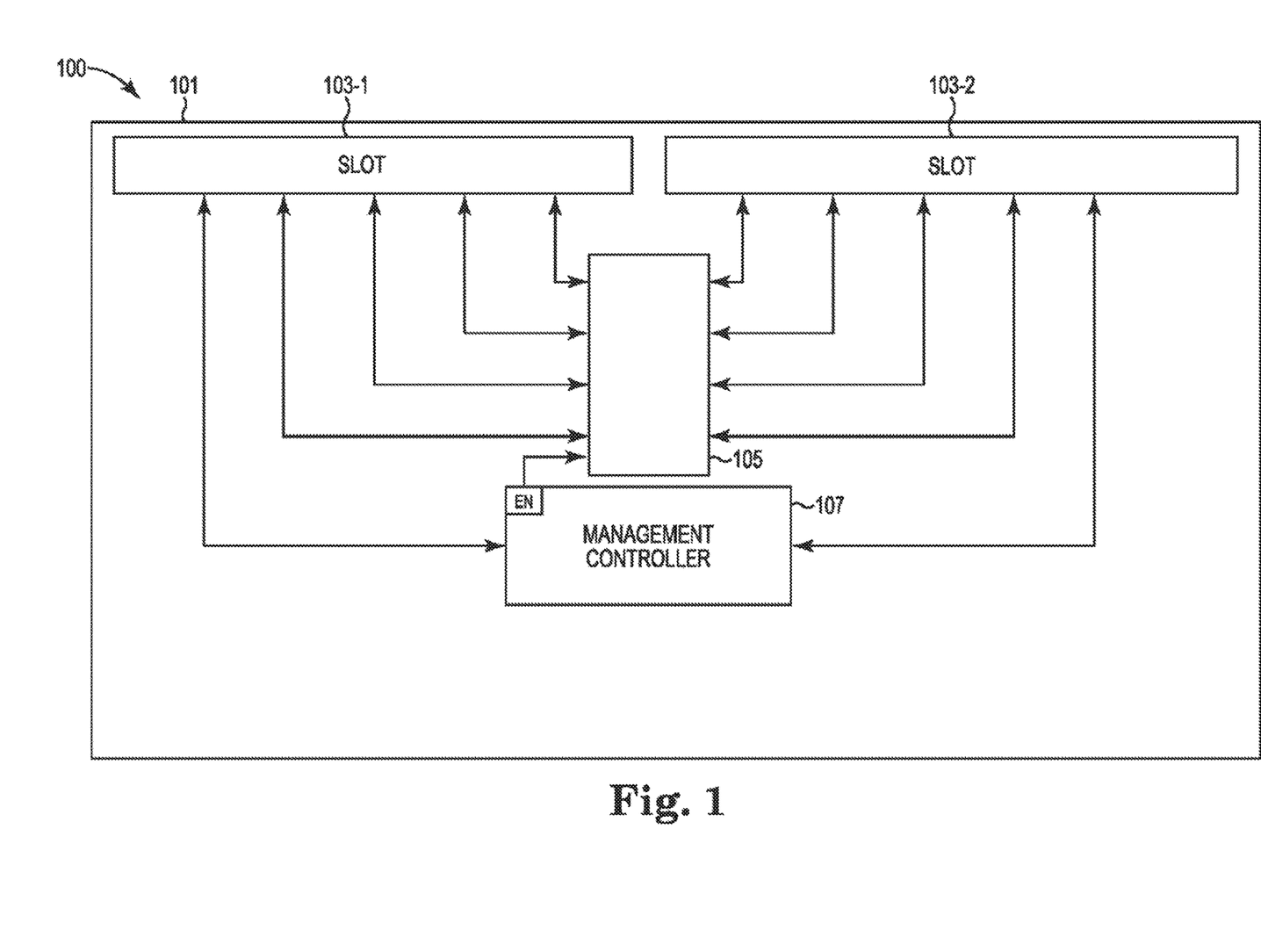
FIG. 1 illustrates a diagram of an example of a video compression system, according to the present disclosure.

FIG. 1 illustrates a diagram of an example of a video compression system 100, according to the present disclosure. While generally, the present disclosure describes video compression, it is noted that the present disclosure applies equally to workload acceleration in other (e.g., non-video) implementations. As illustrated in FIG. 1, the video compression system 100 may include a circuit board 101 including a plurality of slots 103-1 and 103-2 (hereinafter referred to collectively as slots 103), each slot to receive a module. The circuit board 101 may be a server blade to be inserted into a server enclosure. Further, the circuit board 101 may be a printed circuit board to receive one or more slots, among other components. As used herein, a slot refers to a connector that receives a portion of a printed circuit board, such as a module.

Each of the plurality of slots 103 may be MXM slots. However, examples are not so limited, and other general purpose input/output (I/O) slots may be used. Furthermore, while FIG. 1 illustrates the circuit board 101 having two slots (e.g., 103-1 and 103-2), it is noted that the circuit board 101 may have more than two slots. The plurality of slots 103, even when MXM' slots, may be used as a general purpose I/O expansion slots. For instance, as discussed further herein, based on the type of module coupled to each of the plurality of slots 103, the plurality of slots 103 may perform just like PCIe adapter card slots.

Similarly, as discussed further herein, when a graphic coprocessor MXM adapter module is coupled to one of the plurality of slots 103, the module performs like a PCIe adapter card. However, when the combination of a graphic coprocessor module (such as a graphic coprocessor MXM adapter card) and an accelerator module (such as a video compression MXM adapter card) are inserted in the plurality of slots 103, system 100 may configure the pair to become a graphic compression engine to provide improved graphic performance to remote displays.

As illustrated in FIG. 1, the video compression system 100 may include a multiplexor 105 coupled between the plurality of slots 103. The video compression system 100 may also include a management controller 107. Before power on of the server system to which the circuit board 101 is coupled, a chassis controller (not illustrated in FIG. 1) may obtain the configuration of the MXM slots through the management controller 107. If particular modules are coupled to the plurality of slots 103, the management controller 107 may configure the multiplexor 105 and the plurality of slots 103 before system power on. In such a manner, the management controller 107 may either enable or disable the multiplexor 105 to enable or disable transmission of signals between the plurality of slots 103.

The video compression system 100 may also include a management controller 107. The management controller 107 may be included in, and executed by, a chassis controller in a server system. As used herein, a management controller refers to hardware or hardware and programming that is capable of determining a type of module that is coupled to a slot, and communicating information to a chassis controller, among other functions. In some examples, the management controller 107 may include additional components, such as a complex programmable logic device. In contrast, a chassis controller refers to hardware or hardware and programming that is capable of managing all resources in the server system. As described herein, the management controller 107 may be included in, and executed by, the chassis controller. However, examples are not so limited, and the management controller 107 may be a separate physical component from the chassis controller. Regardless of configuration, the management controller 107 operates as an extension of the chassis controller, and communicates with the chassis controller.

The management controller 107 may detect a respective type of module coupled to each of the plurality of slots 103. For instance, the management controller 107 may detect whether a graphics module is coupled to the slot. If the management controller 107 detects that a graphics module is coupled to slot 103-1 and another graphics module is coupled to slot 103-2, then the management controller 107 may disable the multiplexor 105 to prevent signal transmission between slots 103-1 and 103-2. However, if the management controller 107 detects that a graphics module is coupled to slot 103-1 and an accelerator module (such as a video compression card) is coupled to slot 103-2, then the management controller 107 may enable the multiplexor 105 to enable signal transmission between slots 103-1 and 103-2. As such, the management controller 107 may instruct the multiplexor 105 to transmit signals between a first slot (e.g., 103-1) among the plurality of slots 103 and a second slot (e.g., 103-2) among the plurality of slots 103 in response to detection of a graphics coprocessor module coupled to the first slot 103-1 and an accelerator module coupled to the second slot 103-2. In such a manner, the management controller 107 may enable compression by the second slot (e.g., 103-2), of a video output from the first slot (e.g., 103-1). Put another way, the second slot 103-2 may specialize in compressing a video buffer received from the first slot 103-1 in response to the detection of a graphics coprocessor module and an accelerator module.

In some examples, the management controller 107 may detect that a graphic coprocessor module or an accelerator module is not coupled to the first slot 103-1 and the second slot 103-2, respectively. While it is described that a graphic coprocessor module is coupled to the first slot 103-1, and an accelerator module is coupled to the second slot 103-2, examples are not limited to this configuration. For instance, the graphics coprocessor module may be coupled to the slot 103-2 and the accelerator module may be coupled to the slot 103-1. Regardless of the designation of "first" and "second", the management module 107 may detect a graphics coprocessor module coupled to one of the slots and an accelerator module coupled to another one of the slots. The management module 107 may configure the first slot 103-1 and the second slot 103-2 as PCIe adapter card slots in response to the detected absence of the graphics coprocessor module or accelerator module. For example, referring to FIG. 1, in response to detecting that at least one of the graphics coprocessor module and an accelerator module are not coupled to slots 103-1 and 103-2, the management controller may transmit a signal to each of slots 103-1 and 103-2 instructing the slots to utilize pins associated with PCIe transmission. In contrast, if both a graphics coprocessor module and an accelerator module are detected (e.g., coupled to slots 103-1 and 103-2), then the management controller 107 may transmit a signal to the multiplexor 105, enabling the transmission of video I/O signals between slot 103-1 and 103-2.

As described herein, the video compression system 100 may include a chassis controller (not illustrated in FIG. 1) to instruct the management controller 107 to configure the first slot 103-1 and the second slot 103-2 in response to detection of the graphic coprocessor module and the accelerator module. For instance, the management controller 107 may detect a type of module coupled to the first slot 103-1 and a type of module coupled to the second slot 103-2 prior to powering on a server system associated with the chassis controller. The chassis controller, having control of all resources in the server system, may direct the management controller 107 in enabling and/or disabling the multiplexor 105. In response to detecting the type of modules coupled to the slots, the management controller 107 may configure the first slot and the second slot prior to powering on the server system.

Figure 2:
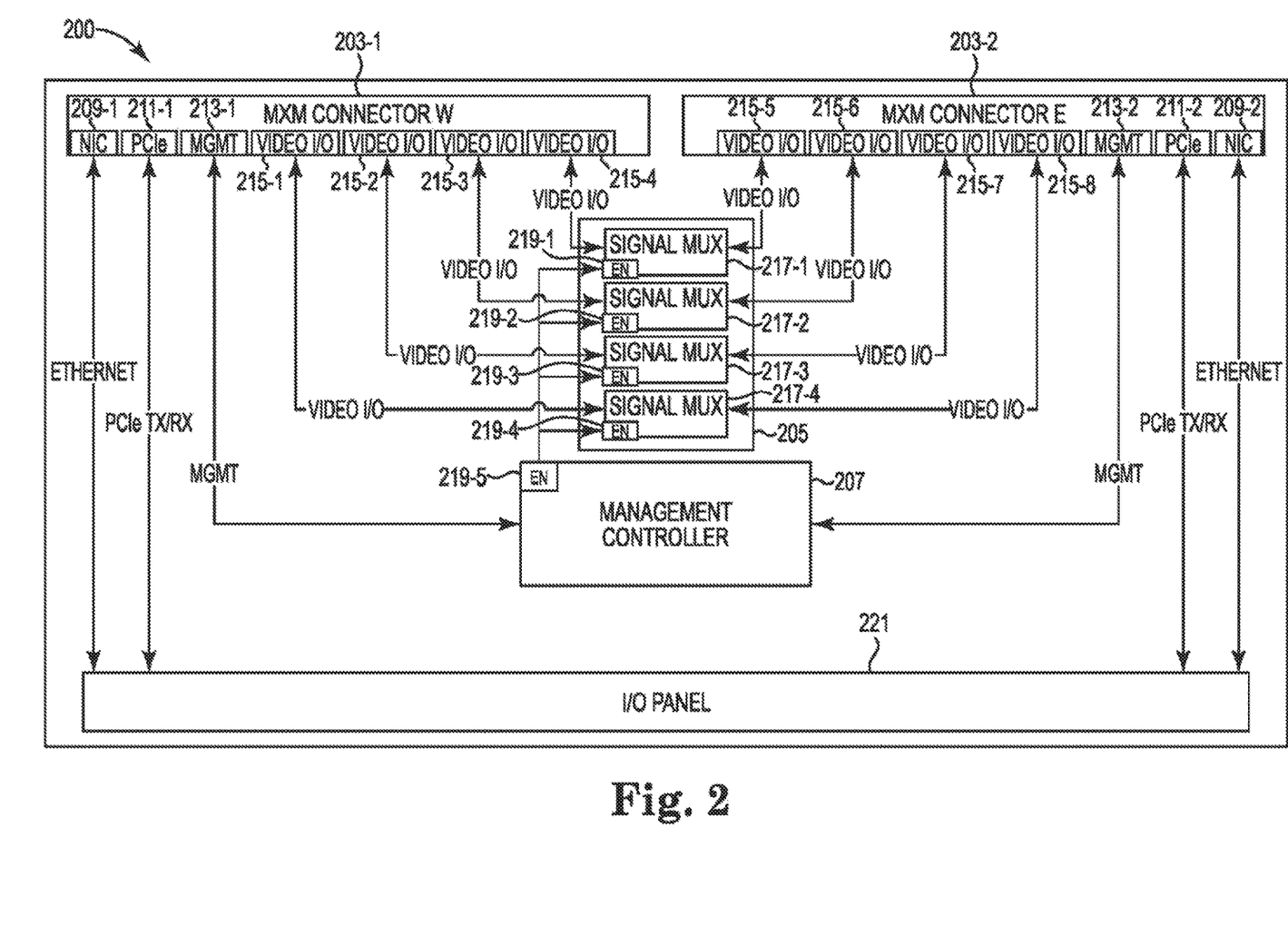
FIG. 2 is a block diagram of an example system for enabling compression of a video output, according to the present disclosure.

FIG. 2 further illustrates a diagram of an example of a system 200 for enabling compression of a video output, according to the present disclosure. As illustrated in FIG. 2, slot 203-1 may be referred to as MXM connector W and slot 203-2 may be referred to as MXM connector E. Each of MXM connector W and MXM connector E may include a network interface controller (NIC) 209-1, 209-2, for transmission of Ethernet signals over the server system, a PCIe interface 211-1, 211-2, to transmit and receive PCIe signals, a management interface 213-1, 213-2 to transmit and receive management signals to and/or from the management controller 207, and four video I/O interfaces 215-1, 215-2, . . . , 215-8, to transmit and receive video I/O signals from each of the plurality of slots 203. Similarly, the multiplexor 205 may include four multiplexor channels 217-1, 217-2, 217-3, 217-4 (e.g., four video I/O channels) coupling the MXM connector W and the MXM connector E.

As illustrated in FIG. 2, each of the multiplexor channels may have an enable signal interface. For instance the management controller 207 may include an enable signal interface 219-5, which is coupled to the enable signal interface on each of the multiplexor channels (e.g., 219-1, 219-2, 219-3, and 219-4). In response to the management controller 207 identifying that a graphics module is coupled to one of the plurality of slots 203 and an accelerator module is coupled to another one of the plurality of slots 203, the management controller 207 may transmit a signal enabling the multiplex transmission between slot 203-1 (MXM connector W illustrated in FIG. 2) and slot 203-2 (MXM connector E illustrated in FIG. 2). Similarly, in response to detecting that a graphics module is coupled to one of the plurality of slots 203 and an accelerator module is coupled to another one of the plurality of slots 203, each slot may be configured such that video is transmitted to an I/O panel 221 via an Ethernet.

Figure 3:
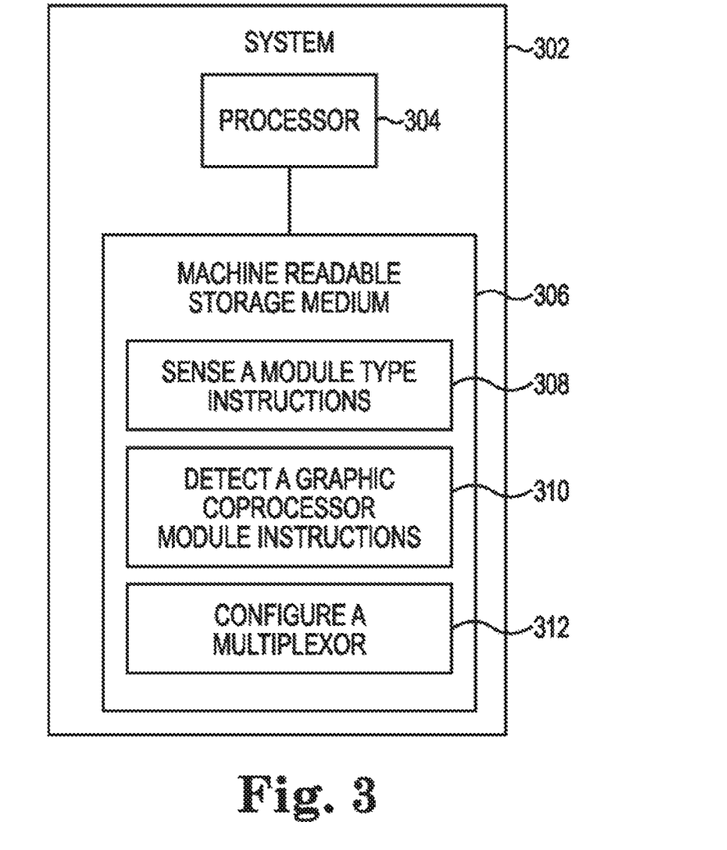
FIG. 3 is a block diagram of an example system for enabling compression of a video output, according to the present disclosure.

FIG. 3 is a block diagram of an example system 302 for enabling compression of a video output, according to the present disclosure. System 302 may include at least one computing device that is capable of communicating with at least one remote system. System 302 may be similar to system 100 of FIG. 1, and system 200 of FIG. 2, for example. In the embodiment of FIG. 3, system 302 includes a processor 304 and a machine-readable storage medium 306. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 304 may be one or more central processing units (CPUs), microprocessors, and/or other hardware devices suitable for retrieval and execution of instructions stored in machine-readable storage medium 306. In the particular embodiment shown in FIG. 3, processor 304 may fetch, decode, and execute instructions 308, 310, 312 for enabling compression of a video output. As an alternative or in addition to retrieving and executing instructions, processor 304 may include one or more electronic circuits comprising a number of electronic components for performing the functionality of one or more of the instructions in machine-readable storage medium 306. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 306 may be any electronic, magnetic, optical, or other physical storage device that stores executable instructions. Thus, machine-readable storage medium 306 may be, for example, Random Access Memory (RAM), an Electrically-Erasable Programmable Read-Only Memory (EEPROM), a storage drive, an optical disc, and the like. Machine-readable storage medium 306 may be disposed within system 302, as shown in FIG. 3. In this situation, the executable instructions may be "installed" on the system 302. Alternatively, machine-readable storage medium 306 may be a portable, external or remote storage medium, for example, that allows system 302 to download the instructions from the portable/external/remote storage medium. In this situation, the executable instructions may be part of an "installation package". As described herein, machine-readable storage medium 306 may be encoded with executable instructions for enabling compression of a video output.

Referring to FIG. 3, sense a type of module instructions 308, when executed by a processor (e.g., 304), may cause system 302 to sense, using a chassis controller, a type of module coupled to a first slot among a plurality of slots and a type of module coupled to a second slot among the plurality of slots. For instance, the machine readable storage medium 306 can store instructions that when executed by the processor 304, can sense a type of module that is coupled to the slot 103-1 (illustrated in FIG. 1) and a type of module that is coupled to the slot 103-2 (illustrated in FIG. 1).

Detect a graphic coprocessor module instructions 310, when executed by a processor (e.g., 304), may cause system 302 to detect, using the chassis controller, a graphic coprocessor module is coupled to the first slot and an accelerator module is coupled to the second slot. For example, the machine readable storage medium 306 can store instructions that when executed by the processor 304, can detect that a graphic coprocessor module is coupled to slot 103-1 and an accelerator module is coupled to slot 103-2. While the foregoing example describes the graphic coprocessor module coupled to slot 103-1, and the accelerator module coupled to slot 103-2, examples are not so limited. For instance, the graphic coprocessor module may be coupled to slot 103-2, and the accelerator module may be coupled to slot 103-1. Regardless of configuration, the chassis controller (via the management controller) may detect that both a graphic coprocessor module and an accelerator module are coupled to the slots.

Configure a multiplexor instructions 312, when executed by a processor (e.g., 304), may cause system 302 to configure, using the chassis controller, a multiplexor and configurations of the first and second slots in response to the detection of the graphics coprocessor and accelerator modules. For instance, as discussed in relation to FIG. 1, the multiplexor (e.g., multiplexor 105 illustrated in FIG. 1) can direct signals from the first slot (e.g., slot 103-1 illustrated in FIG. 1) to the second slot (e.g., slot 103-2 illustrated in FIG. 1) and vice versa, rather than directly to an I/O panel in response to detection of a graphics coprocessor module coupled to one of the slots and an accelerator module coupled to the other slot.

In some examples, the machine readable storage medium 306 can store instructions that when executed by the processor 304 can cause the system 302 to enable, using the chassis controller, compression by the second slot (e.g., 103-2) of a video output associated with the first slot (e.g., 103-1) in response to detection of the graphics coprocessor and accelerator modules. For instance, if a graphics coprocessor module is coupled to a first slot (e.g., 103-2 illustrated in FIG. 1) and an accelerator module is coupled to a second slot (e.g., 103-1 illustrated in FIG. 1), the graphics output from the first slot may be transferred to the second slot then compressed and transmitted over an Ethernet.

Additionally, the machine readable storage medium 306 can store instructions that when executed by the processor 304 can cause the system 302 to send the compressed video to a remote display in a server system associated with the chassis controller. For instance, the chassis controller may be coupled to a plurality of remote computing devices, such as thin clients and/or laptop computers, among others. The chassis controller may coordinate transmission of information within the network. As such, the compressed video may be transmitted to at least one of the plurality of remote computing devices over an Ethernet.

In some examples, the machine readable storage medium 306 can store instructions that when executed by the processor 304 can cause the system 302 to detect, using the chassis controller, that the graphic coprocessor module or the accelerator module is not coupled to the first slot and the second slot, respectively, and configure the first slot and the second slot as peripheral component interconnect express adapter card slots in response to the detected absence of the graphics coprocessor module or accelerator module. For example, if the management controller (107 illustrated in FIG. 1) doesn't detect that a graphics coprocessor module and an accelerator module are both coupled to the slots (e.g., slots 103 illustrated in FIG. 1), then the management controller may configure the slots for PCIe transmission prior to powering on the server system. Put another way, the management controller my enable pins in the first slot associated with a PCIe adapter card in response to a detected absence of the graphics coprocessor module or accelerator module.

Figure 4:
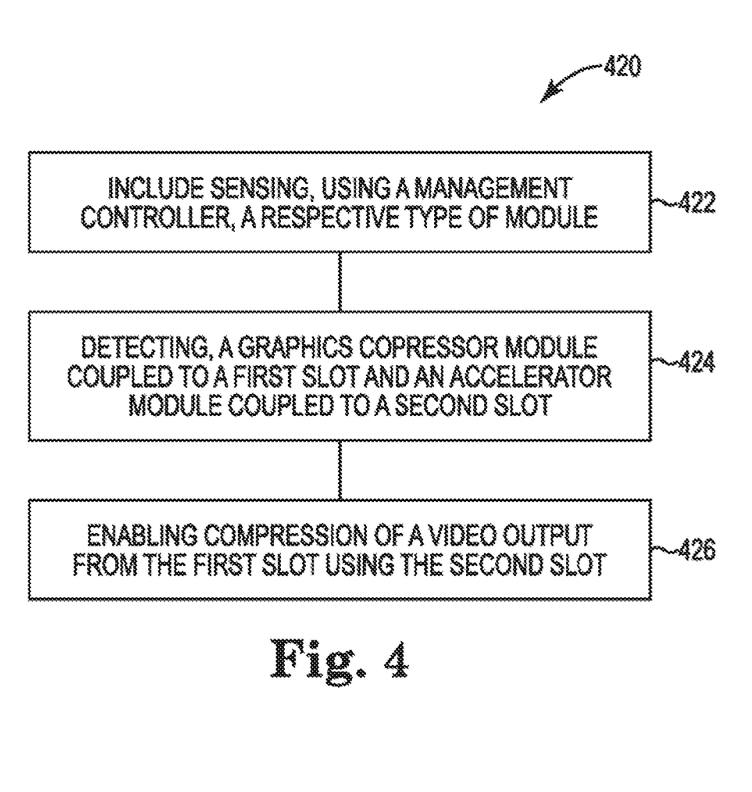
FIG. 4 illustrates an example method for enabling compression of a video output, according to the present disclosure.

FIG. 4 illustrates an example method 420 for enabling compression of a video output, according to the present disclosure. At 422, the method 420 may include sensing, using a management controller, a respective type of module coupled to each of a plurality of slots.

At 424, the method 420 may include detecting, using the management controller, a graphics coprocessor module coupled to a first slot among the plurality of slots and an accelerator module coupled to a second slot among the plurality of slots. At 426, the method 420 may include enabling compression, using the management controller, of a video output from the first slot using the second slot, in response to the detection of the graphics coprocessor module and the accelerator module. For example, enabling compression of the video output may include enabling transmission of multiplex signals between the first slot and the second slot. Further, enabling compression of the video output may include configuring the first slot and the second slot for video compression, using the management controller, in response to the detection of the graphics coprocessor module and the accelerator module.

For instance, the method 420 may include detecting, using the management controller, that the graphic coprocessor module or the accelerator module is not coupled to the first slot and the second slot, respectively. In response to the detected absence of the graphics coprocessor module or the accelerator module, the method 420 may include enabling pins in the first slot and/or the second slot associated with the PCIe adapter card rather than the MXM adapter card.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A video compression system, comprising:
    a circuit board including a plurality of adapter card slots, each slot to receive a hardware module;
    a multiplexor coupled between the plurality of adapter card slots; and
    a management controller to:
        detect a respective type of module coupled to each of the plurality of adapter card slots; and
        instruct the multiplexor to transmit signals between a first slot among the plurality of adapter card slots and a second slot among the plurality of adapter card slots in response to detection of a graphics coprocessor module coupled to the first slot and an accelerator module coupled to the second slot; and
        enable compression by the accelerator module of the second slot, of a video output from the first slot, in response to the detection of the graphics coprocessor module and the accelerator module.

2. The video compression system of claim 1, wherein each of the plurality of adapter card slots are mobile peripheral component interconnect express module (MXM) expansion slots.

3. The video compression system of claim 1, further comprising the management controller to:
    detect that the graphic coprocessor module or the accelerator module is not coupled to the first slot and the second slot, respectively; and
    configure the first slot and the second slot as peripheral component interconnect express adapter card slots in response to the detected absence of the graphics coprocessor module or accelerator module.

4. The video compression system of claim 1, wherein the management controller is included in, and executed by, a chassis controller in a server system.

5. The video compression system of claim 1, further comprising a chassis controller to instruct the management controller to configure the first and the second slots in response to detection of the graphic coprocessor module and the accelerator module.

6. The video compression system of claim 5, further comprising the management controller to:
    detect a type of module coupled to the first slot and the second slot prior to power on of a server system associated with the chassis controller; and
    configure the first slot and the second slot prior to power on of the server system.

7. The video compression system of claim 1, wherein the graphics coprocessor module performs two dimensional (2D) and/or three dimensional (3D) rendering to assist a main processor.

8. The video compression system of claim 1, wherein the accelerator module accepts video output from the graphics coprocessor module and compresses the video output before transmission to a display.

9. The video compression system of claim 1, wherein each slot receives a hardware module via a connector that receives a portion of a printed circuit board.

10. A non-transitory machine readable medium storing instructions executable by a processor of a system to cause the system to:
    sense, using a chassis controller, a type of hardware module coupled to a first adapter card slot among a plurality of slots and a type of hardware module coupled to a second adapter card slot among the plurality of slots;
    detect, using the chassis controller, a graphic coprocessor module is coupled to the first adapter card slot and an accelerator module is coupled to the second adapter card slot; and
    enable, using the chassis controller, compression, by the accelerator module of the second adapter card slot, of a video output associated with the first adapter card slot, in response to the detection of the graphics coprocessor and accelerator modules.

11. The non-transitory machine readable medium of claim 10, wherein the instructions to cause the system to enable, using the chassis controller, compression by the second adapter card slot include instructions to cause the system to:
    configure, using the chassis controller, a multiplexor; and
    prepare, using the chassis controller, configurations of the first and second adapter card slots in response to the detection of the graphics coprocessor and accelerator modules.

12. The non-transitory machine readable medium of claim 11, including instructions to cause the system to send the compressed video to a remote display in a server system associated with the chassis controller.

13. The non-transitory machine readable medium of claim 10, including instructions to cause the system to:
   detect, using the chassis controller, that the graphic coprocessor module or the accelerator module is not coupled to the first adapter card slot and the second adapter card slot, respectively.

14. The non-transitory machine readable medium of claim 13, including instructions to cause the system to:
   enable pins in the first adapter card slot associated with a peripheral component interconnect express adapter card in response to the detected absence of the graphics coprocessor module or accelerator module.

15. The non-transitory machine readable medium of claim 10, wherein the graphics coprocessor module performs two dimensional (2D) and/or three dimensional (3D) rendering to assist a main processor, the accelerator module accepts video output from the graphics coprocessor module and compresses the video output before transmission to a display, and each slot receives a hardware module via a connector that receives a portion of a printed circuit board.

16. A method for enabling compression of a video output, the method comprising:
   sensing, using a management controller, a respective type of hardware module coupled to each of a plurality of adapter card slots;
   detecting, using the management controller, a graphics coprocessor module coupled to a first slot among the plurality of adapter card slots and an accelerator module coupled to a second slot among the plurality of adapter card slots; and
   enabling, using the management controller and in response to the detection of the graphics coprocessor module and the accelerator module, compression of a video output from the first slot using the accelerator module of the second slot.

17. The method of claim 16, wherein enabling, using the management controller, includes enabling transmission of multiplex channels between the first slot and the second slot.

18. The method of claim 16, wherein enabling, using the management controller, includes configuring the first slot and the second slot for video compression by the second slot.

19. The method of claim 16, further comprising:
   detecting, using the management controller, that the graphic coprocessor module or the accelerator module is not coupled to the first slot and the second slot, respectively; and
   enabling pins in the first slot associated with a peripheral component interconnect express adapter card in response to the detected absence of the graphics coprocessor module or the accelerator module.

20. The method of claim 16, wherein the graphics coprocessor module performs two dimensional (2D) and/or three dimensional (3D) rendering to assist a main processor, the accelerator module accepts video output from the graphics coprocessor module and compresses the video output before transmission to a display, and each slot receives a hardware module via a connector that receives a portion of a printed circuit board.

* * * * *